(12) United States Patent
Huang et al.

(10) Patent No.: US 8,490,503 B2
(45) Date of Patent: Jul. 23, 2013

(54) TORQUE-ADJUSTING MACHINE FOR HINGE

(75) Inventors: Teng-Tsung Huang, Taipei Hsien (TW); Guo-Jun Yu, Shenzhen (CN); Yong-Bing Hu, Shenzhen (CN); Zhan Shang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 392 days.

(21) Appl. No.: 12/889,554

(22) Filed: Sep. 24, 2010

(65) Prior Publication Data

US 2011/0283844 A1 Nov. 24, 2011

(30) Foreign Application Priority Data

May 21, 2010 (CN) .......................... 2010 1 0179566

(51) Int. Cl.
*G01L 3/02* (2006.01)
*G01L 3/00* (2006.01)

(52) U.S. Cl.
USPC .................. 73/865.3; 73/862.191; 73/862.08

(58) Field of Classification Search
USPC ............... 73/847, 848, 862.191, 862.08, 856
See application file for complete search history.

(56) References Cited

U.S. PATENT DOCUMENTS

| 2,300,288 | A  | * | 10/1942 | Hullhorst | 73/862.191 |
|---|---|---|---|---|---|
| 3,508,806 | A  | * | 4/1970 | Hall | 359/393 |
| 5,567,884 | A  | * | 10/1996 | Dickinson et al. | 73/814 |
| 6,381,809 | B2 | * | 5/2002 | Uneme et al. | 16/342 |
| 6,826,963 | B2 | * | 12/2004 | Liu et al. | 73/798 |
| 8,291,774 | B2 | * | 10/2012 | Huang et al. | 73/862.191 |
| 8,302,488 | B2 | * | 11/2012 | Hsu et al. | 73/856 |
| 8,316,720 | B2 | * | 11/2012 | Huang et al. | 73/847 |
| 2004/0065155 | A1 | * | 4/2004 | Liu et al. | 73/798 |
| 2011/0277561 | A1 | * | 11/2011 | Huang et al. | 73/862.191 |
| 2012/0024078 | A1 | * | 2/2012 | Huang et al. | 73/847 |

\* cited by examiner

*Primary Examiner* — Lisa Caputo
*Assistant Examiner* — Jonathan Dunlap
(74) *Attorney, Agent, or Firm* — Altis Law Group, Inc.

(57) ABSTRACT

A torque-adjusting machine includes a securing fixture, a torque-detecting mechanism, a driving device and an adjusting mechanism. The securing fixture is capable of retaining a first bracket of a hinge. The driving device is capable of retaining a second bracket of the hinge. The torque-detecting mechanism is connected to the securing fixture and capable of detecting torque of the hinge through rotating the first bracket of the hinge relative to the second bracket of the hinge. The adjusting mechanism includes an adjusting pole. The adjusting pole is capable of moving from a first position, where the adjusting pole is capable of engaging with the hinge and adjusting the torque of the hinge by rotation, to a second position, where the adjusting pole is capable of being disengaged from the hinge.

18 Claims, 13 Drawing Sheets

TORQUE-ADJUSTING MACHINE FOR HINGE

BACKGROUND

1. Technical Field

The present disclosure relates to torque-adjusting machines for hinges, especially to a torque-adjusting machine for detecting and adjusting a hinge.

2. Description of Related Art

A hinge is a type of bearing that connects two solid objects, typically allowing only a limited angle of rotation between them. Two objects connected by an ideal hinge rotate relative to each other about a fixed axis of rotation. The hinge usually includes a fastener to adjust torque between the two objects. Torque of the hinges must be tested and adjusted before placed into practical application. However, the hinges are typically manually tested, and manual testing is inefficient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
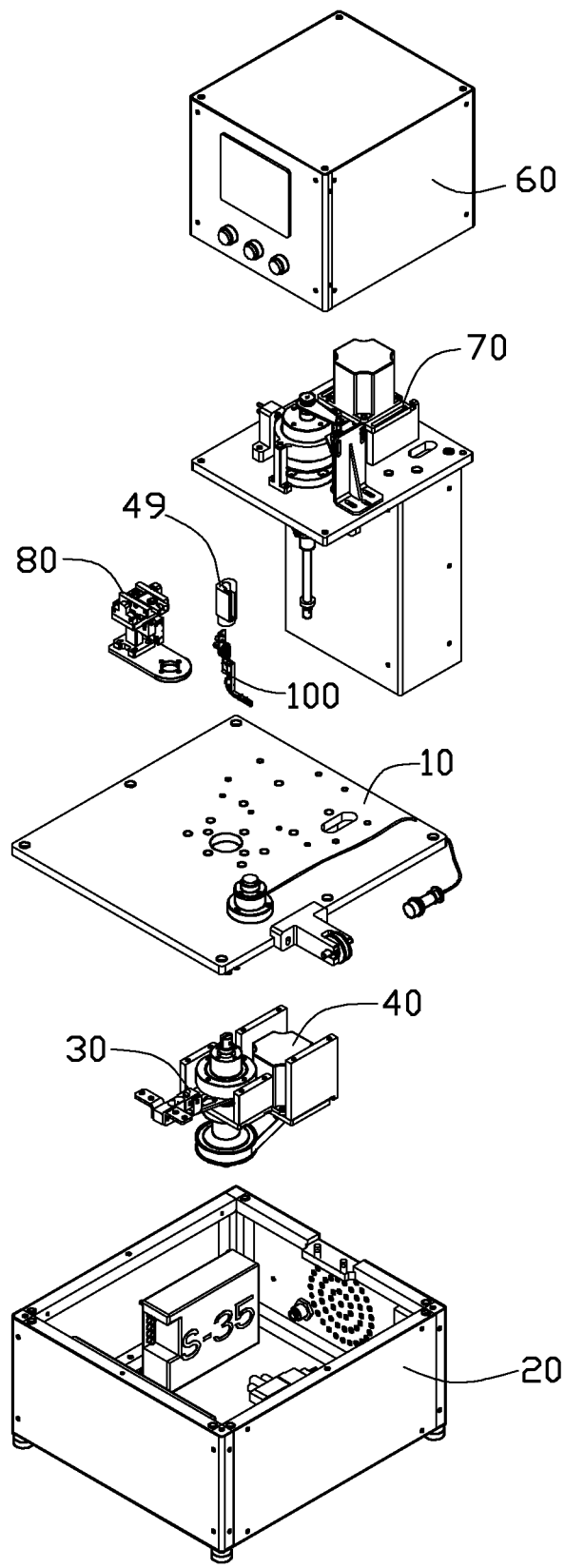
FIG. 1 is an exploded, isometric view of an embodiment of a torque-adjusting machine.

Referring to FIG. 1, one embodiment of torque-adjusting machine for hinge is used for detecting and adjusting the torque of a hinge 100. The torque-adjusting machine includes an operating console 10, a bottom chamber 20, a system chamber 60, a securing fixture 80 located on the operating console 10, a torque-detecting mechanism 30, a driving device 40 and an adjusting mechanism 70.

Figure 2:
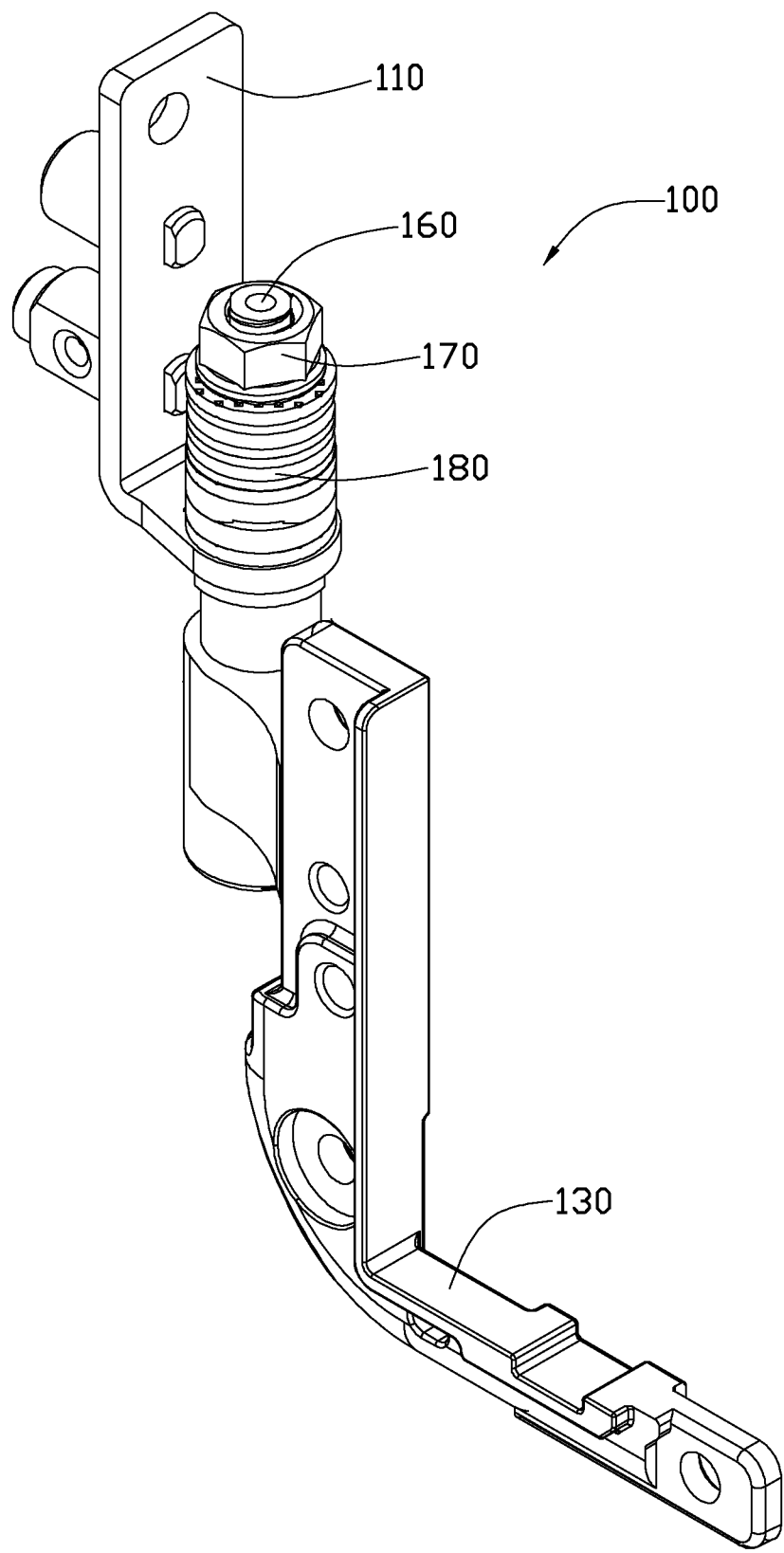
FIG. 2 is an assembled view of one embodiment of a hinge.

Referring to FIG. 2, the hinge 100 includes a pivot 160, a first bracket 110, a second bracket 130, a plurality of gaskets 180 located around the pivot 160 and a fastener 170 mounted to a top portion of the pivot 160. Torque between the first bracket 110 and the second bracket 130 can be adjusted by tightening or loosening the fastener 170.

Figure 3:
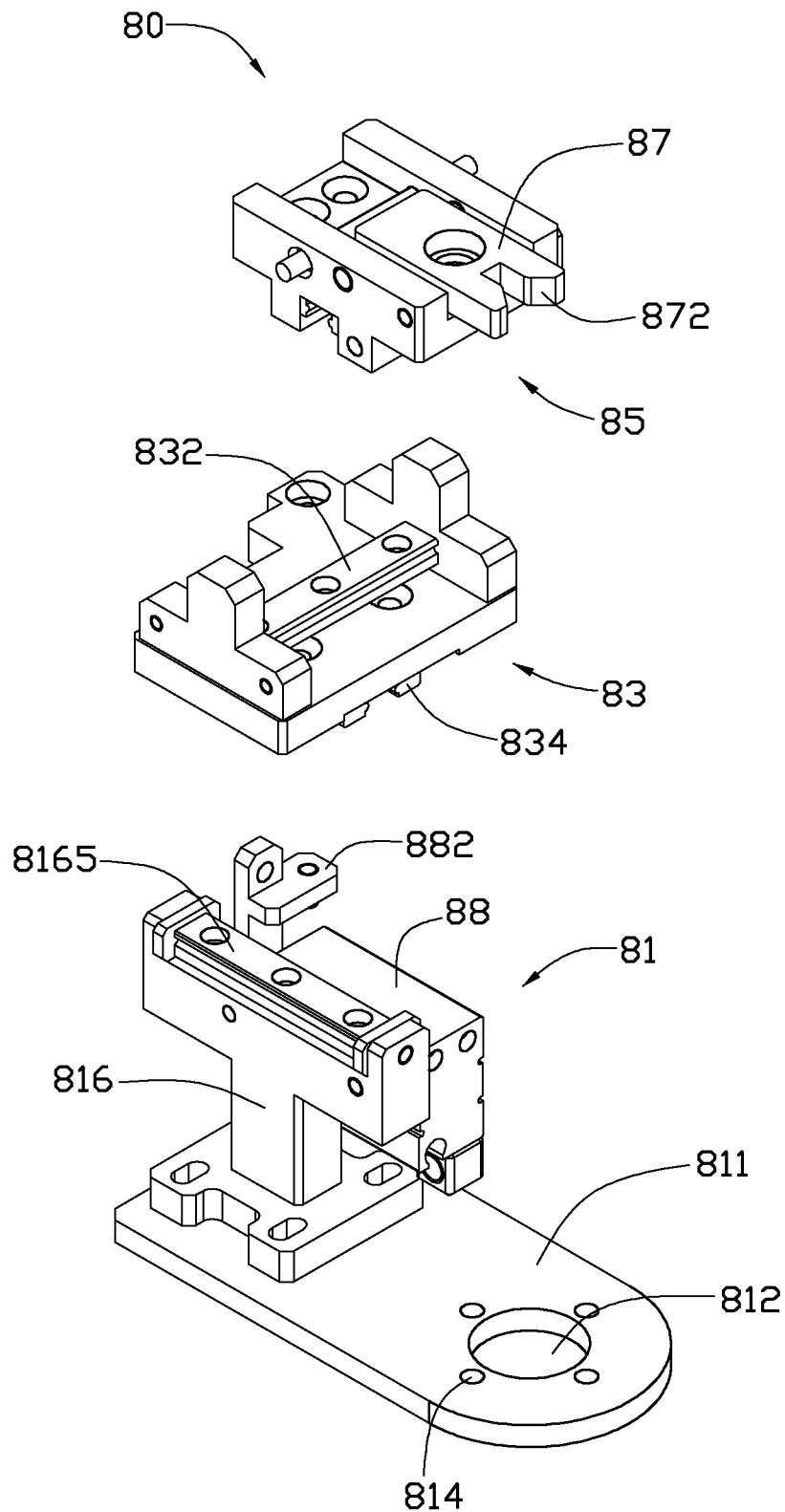
FIG. 3 is an exploded, isometric view of a securing fixture of FIG. 1.
Figure 4:
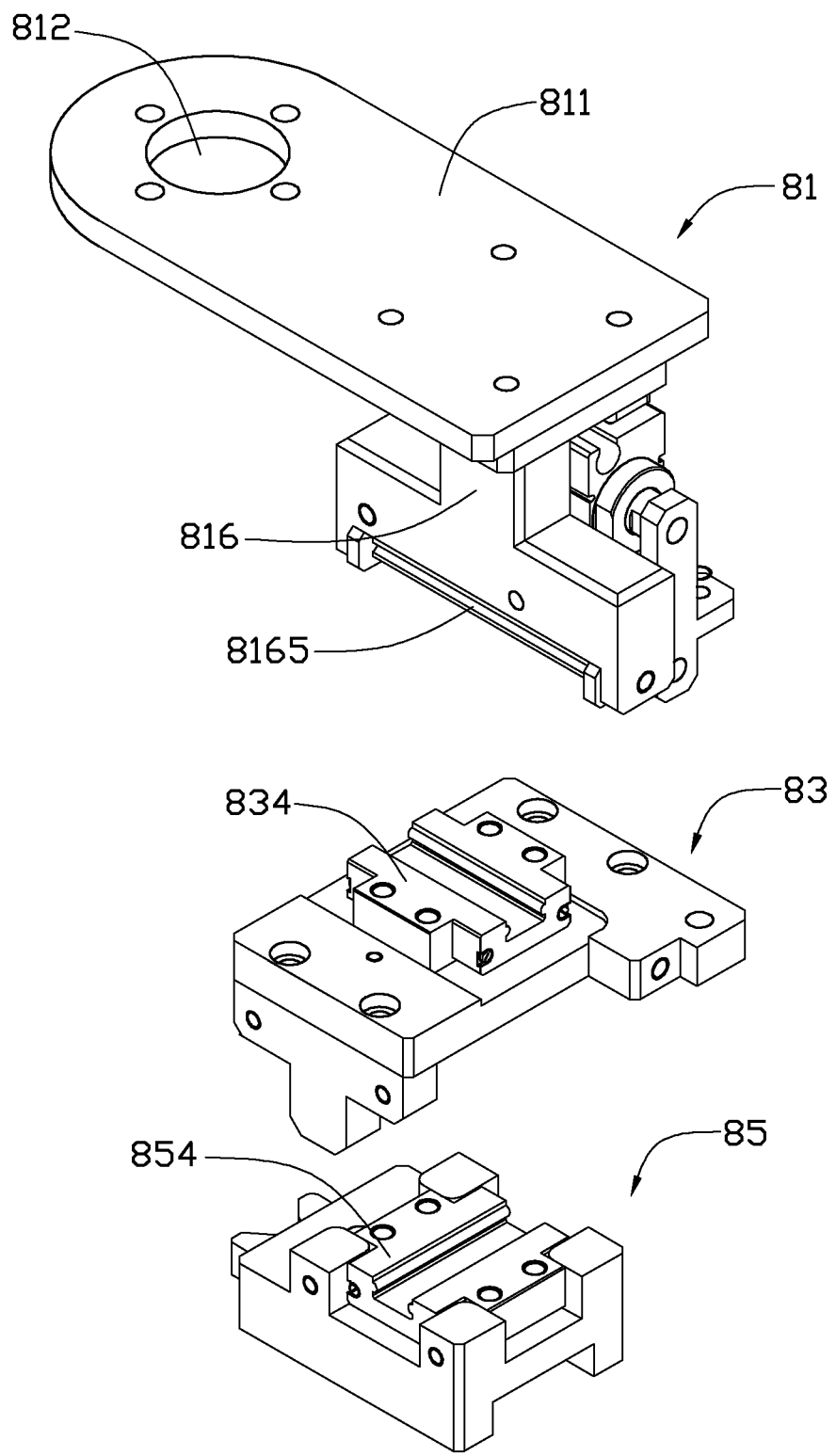
FIG. 4 is a view shown from another aspect of FIG. 3.
Figure 5:
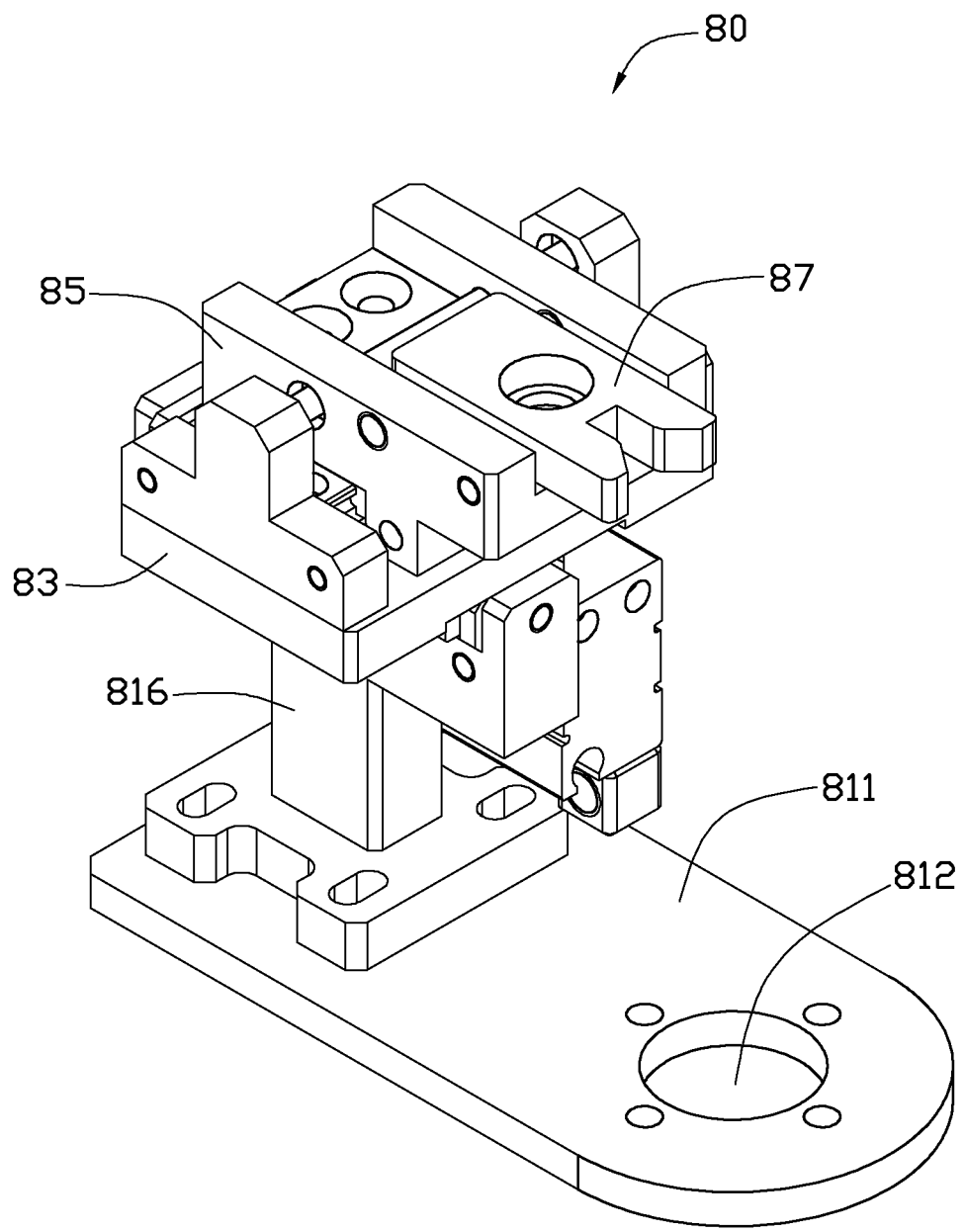
FIG. 5 is an assembled view of FIG. 3.

Referring from FIG. 3 to FIG. 5, the securing fixture 80 includes a base 81, a first securing platform 83 and a second securing platform 85. The base 81 includes a bottom plate 811 and a supporting bracket 816 located on the bottom plate 811. A through opening 812 and a plurality of mounting holes 814 are defined in the bottom plate 811. The supporting bracket 816 includes a first rail 8165 extending along a first direction. A fixture cylinder 88 is located on the supporting bracket 816. A driving arm 882 is connected to the fixture cylinder 88. A first securing platform 83 includes a first sliding portion 834 corresponding to the first rail 8165 and a second rail 832 extending along a second direction. The first securing platform 83 can slide along the first direction relative to the base 81. The second securing platform 85 includes a second slide portion 854 corresponding to the second rail 832 and a clasp 87. The second securing platform 85 can slide along the second direction relative to the first securing platform 83. A cuneiform engaging cutout 872 is defined for retaining the hinge 100. The first direction is perpendicular to the second direction.

During assembling the securing fixture 80, the first securing platform 83 is slidingly mounted to the supporting bracket 816, and the second securing platform 85 is slidingly mounted to the first securing platform 83. The fixture cylinder 88 mounts to the supporting bracket 816. The driving arm 882 connects to the first securing platform 83. The first securing platform 83 can be driven by the fixture cylinder 88 along the first direction, and the second securing platform 85 can be driven along the second direction. Therefore, a fixture position of the securing fixture 80 may be adjusted in a horizontal plane.

Figure 6:
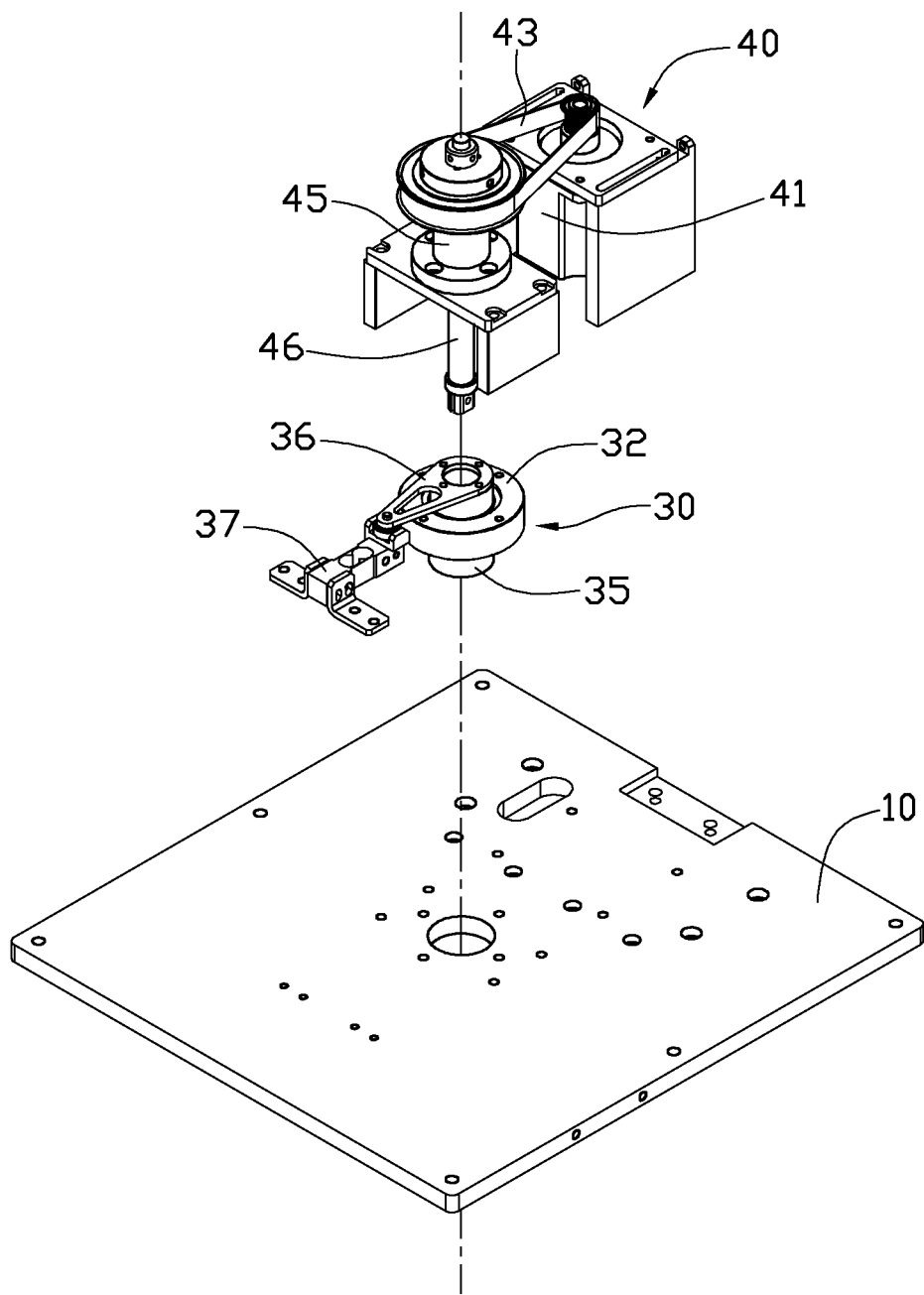
FIG. 6 is a partial exploded view of FIG. 1, showing an operating console, a driving device and a torque-detecting mechanism.
Figure 7:
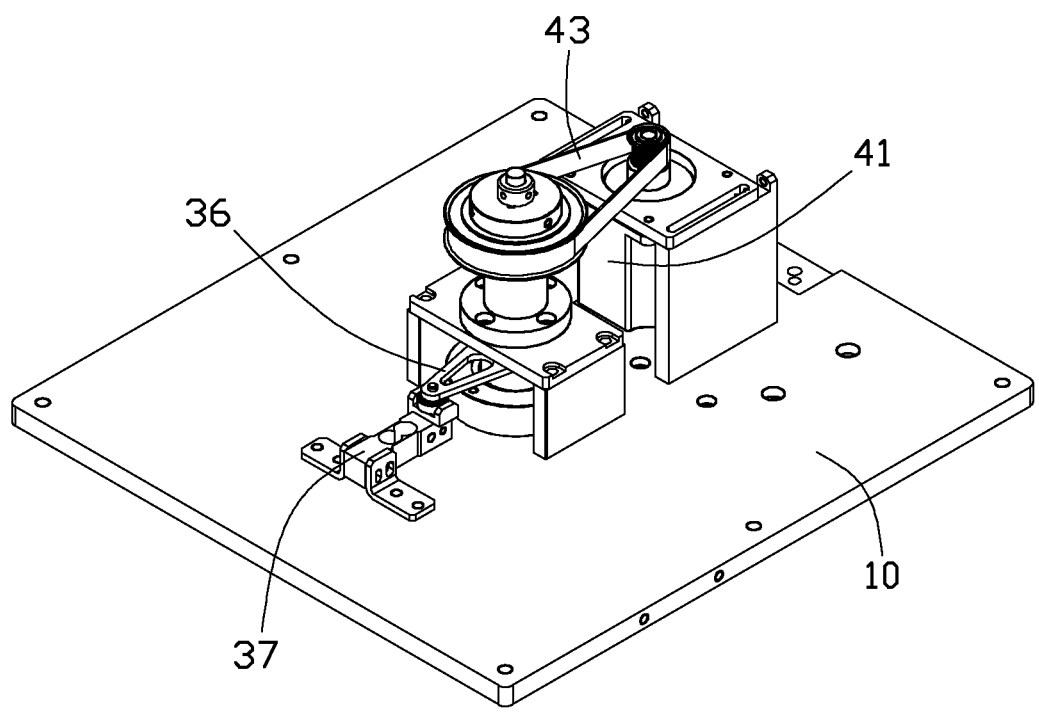
FIG. 7 is an assembled view of FIG. 6.

Referring to FIG. 6 and FIG. 7, the torque-detecting mechanism 30 is partially located within the bottom chamber 20. The torque-detecting mechanism 30 includes a hollow bearing seat 32 located on the operating console 10, a sleeve 35 extending through the bearing seat 32 and the operating console 10, a connecting arm 36, a torque sensor 37 located on the operating console 10. The sleeve 35 connects to the base 81 of the securing fixture 80. The connecting arm 36 connects to the sleeve 35 and the torque sensor 37. The torque sensor 37 can detect torque transmitted from the sleeve 35 and the connecting arm 36.

Referring to FIG. 6 and FIG. 7, the driving device 40 includes a driving motor 41, a transmission belt 43, a shaft bearing 45, a driving pole 46 extending through the shaft bearing 45 and a retainer 49 (as shown in FIG. 1). The driving pole 46 connects to the hollow bearing seat 32. The driving motor 41 rotates the driving pole 46 by the transmission belt 43. The driving pole 46 rotates the retainer 49. The retainer 49 is located on top of the base 81 and used to retain the hinge 100.

Figure 8:
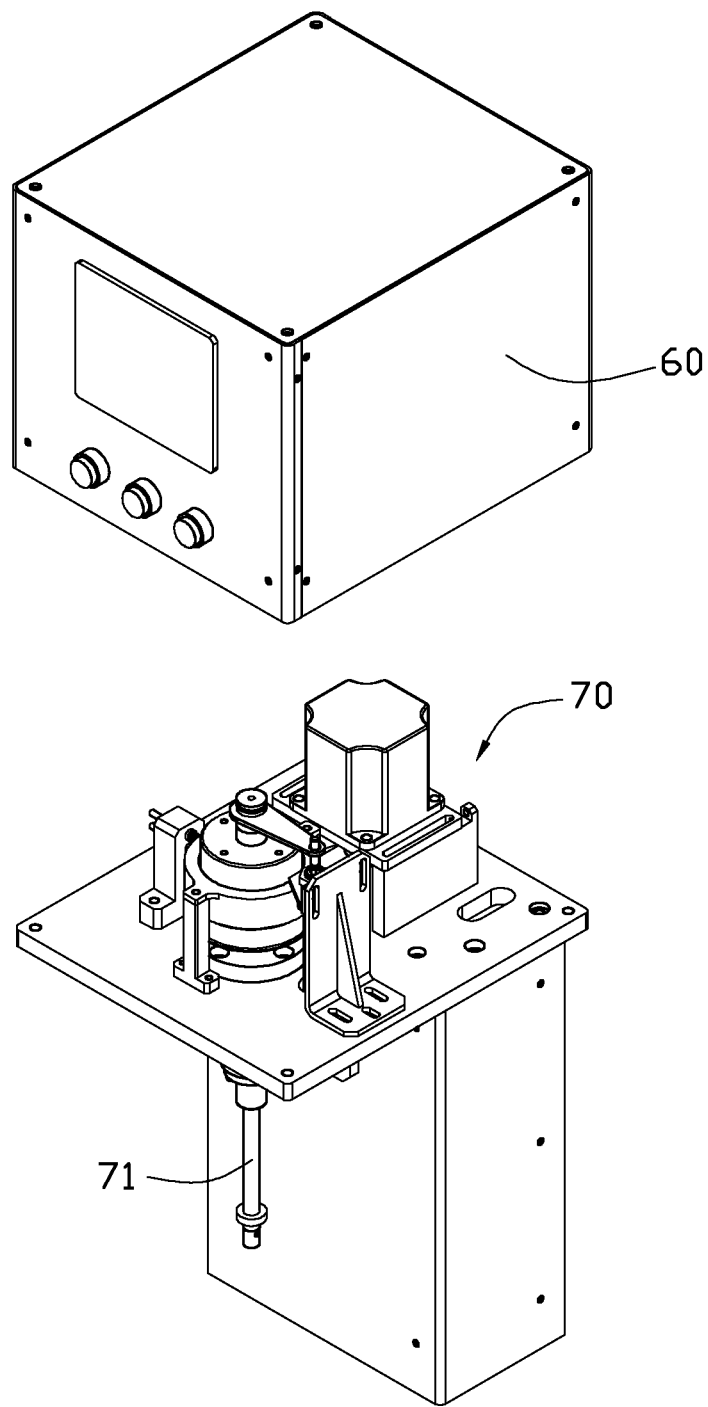
FIG. 8 is a partial exploded view of FIG. 1, showing a system chamber and an adjusting mechanism.
Figure 9:
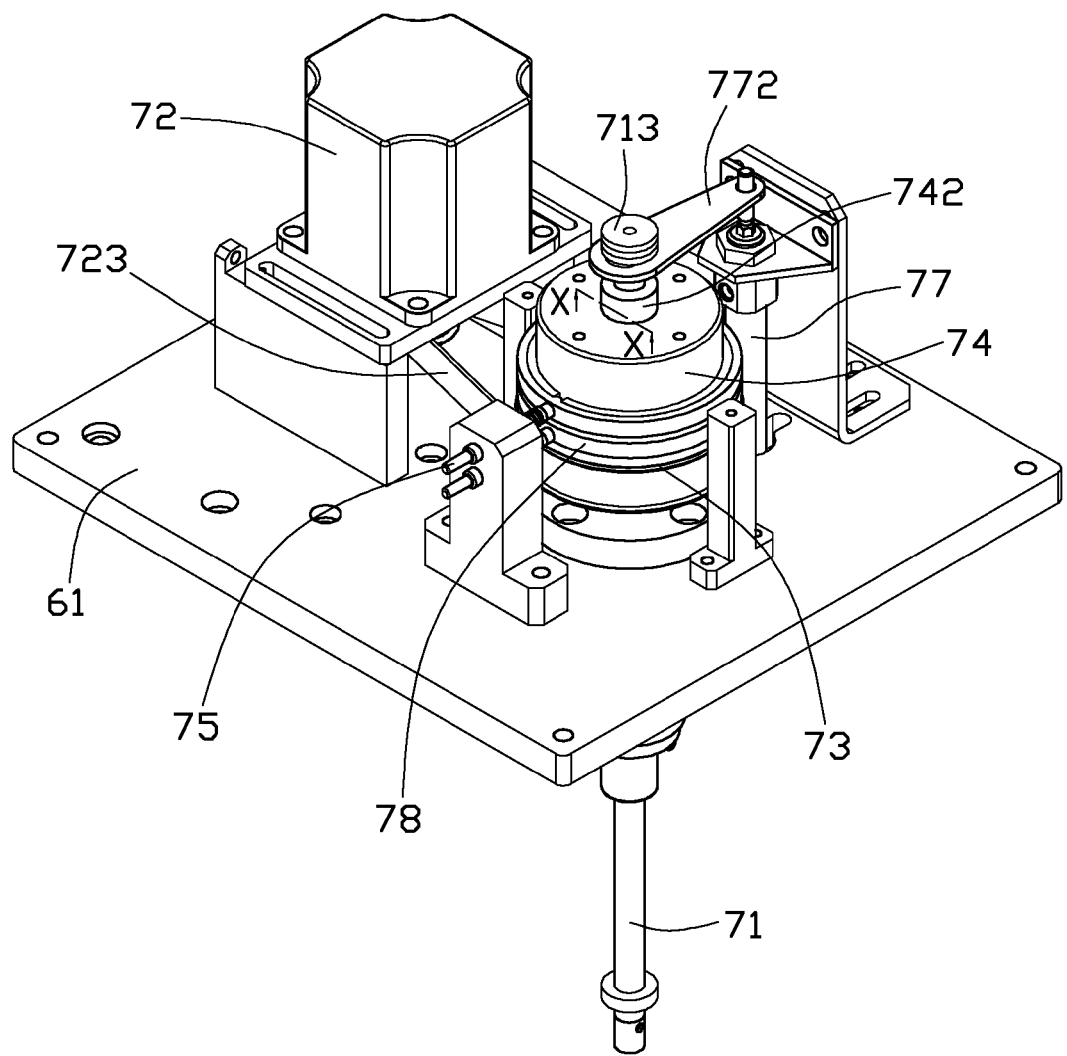
FIG. 9 is an enlarged view of the adjusting mechanism of FIG. 8.

Referring to FIG. 8 and FIG. 9, the adjusting mechanism 70 is partially located in the system chamber 60. The adjusting mechanism 70 includes an adjusting pole 71, a lift cylinder 77, a connecting rod 772, a rotation motor 72, a rotary tray 73, a transmission belt 723, an electro-magnetic clutch 74, two metal rings 78 located around the rotary tray 73 and two input electrodes 75 contacting the two metal rings 78.

The connecting rod 772 connects to the lift cylinder 77 at one end and is located around the adjusting pole 71 at the other end. A head portion 713 is located on a top distal portion of the adjusting pole 71. The connecting rod 772 is located below the head portion 713. The lift cylinder 77 can lift the adjusting pole 71 through driving the connecting rod 772. In operation, the adjusting pole 71 is lifted up by the lift cylinder 77 through rising force of the connecting rod 772; and the adjusting pole 71 free falls when the lift cylinder 77 lowers. Thus, positions of the adjusting pole 71 can be modified by the lift cylinder 77.

Figure 10:
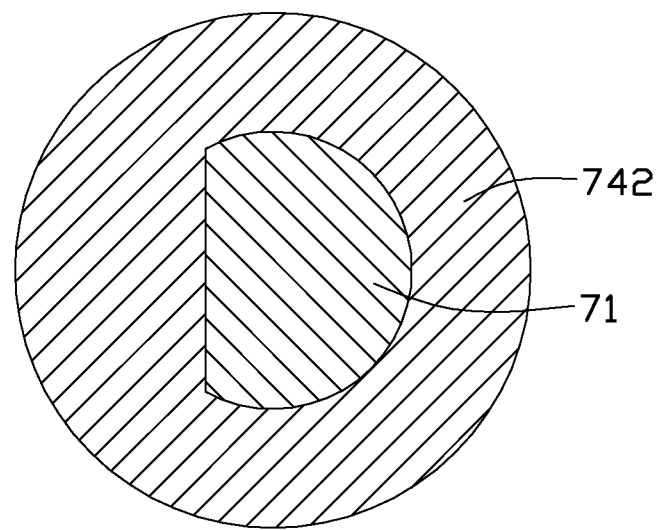
FIG. 10 is a sectional view in an enlarged scale taken along line X-X of FIG. 9.

The system chamber 60 includes a support plate 61. A higher portion of the adjusting pole 71 is located in the system chamber 60 and a lower portion of the adjusting pole 71 extends out of the system chamber 60 for adjusting the hinge 100. The rotary tray 73 mounts to the supporting plate 61 through a bearing (not shown). The rotary tray 73 and the electro-magnetic clutch 74 are installed around the adjusting pole 71. The rotary tray 73 may rotate relative to the adjusting pole 71. The adjusting pole 71 has a non-circular cross section at the electro-magnetic clutch 74. The electro-magnetic clutch 74 includes a holding portion 742. An engaging hole is defined in the holding portion 742 to engage with the adjusting pole 71. As shown in FIG. 10, in one embodiment, the adjusting pole 71 has a D-shaped cross section engaged with the holding portion 742. In this way, the adjusting pole 71 may rotate by the force of the electro-magnetic clutch 74. The electro-magnetic clutch 74 can magnetically attach to and rotate with the rotary tray 73 when the electro-magnetic clutch 74 is powered. The rotary tray 73 can rotate by the rotation motor 72 through the transmission belt 723. Thus, a rotation angle of the adjusting pole 71 can be modified by the rotation motor 72.

The two metal rings 78 are used for powering the electro-magnetic clutch 74. The two metal rings 78 are installed around the rotary tray 73. The two metal rings 78 are insulated from each other by an insulating medium (not shown). The two input electrodes 75 are located on the support plate 61 and electrically contact the two metal rings 78. Thus, the two metal rings 78 can always be powered through the two input electrodes 75, during rotation of the two metal rings 78.

When the adjusting pole 71 needs to be rotated, the input electrodes 75 are powered, and the electro-magnetic clutch 74 magnetically attach to the rotary tray 73. The rotary tray 73 rotates by the rotation motor 72. The electro-magnetic clutch 74 is rotated with the rotary tray 73. Thus, the adjusting pole 71 rotates to adjust the fastener 170 of the hinge 100.

Figure 11:
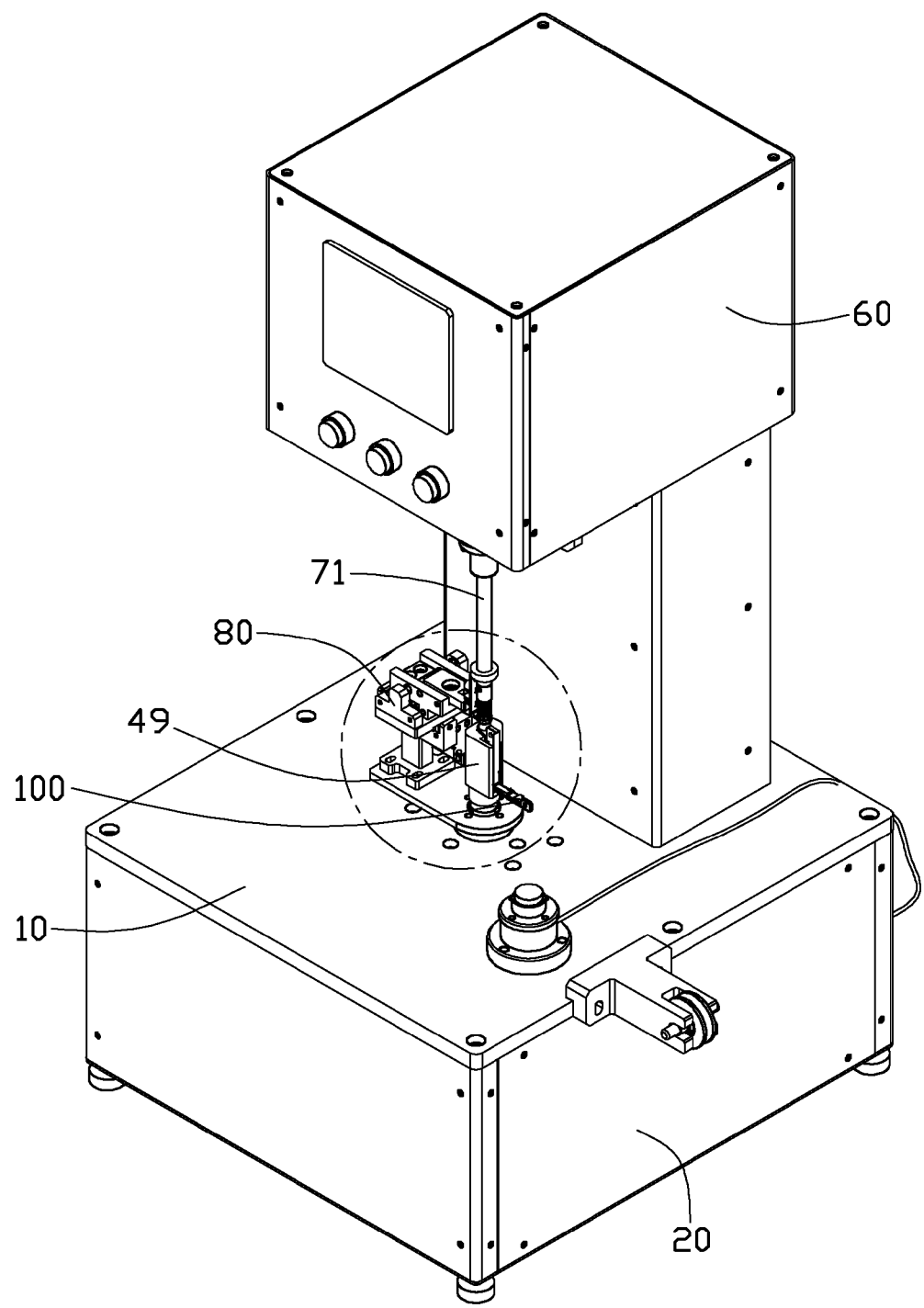
FIG. 11 is an assembled view of FIG. 1.

Referring to FIG. 11, during assembly of the torque-adjusting machine, the operating console 10 is mounted to the bottom chamber 20. The system chamber 60 mounts to operating console 10. The torque-detecting mechanism 30 and the driving device 40 are mounted under the operating console 10. The sleeve 35 extends through the operating console 10 and mount to the base 81 of the securing fixture 80. The driving pole 46 extends through the sleeve 35. The retainer 49 mounts on a top portion of the driving pole 46. The adjusting mechanism 70 is located in the system chamber 60.

Figure 12:
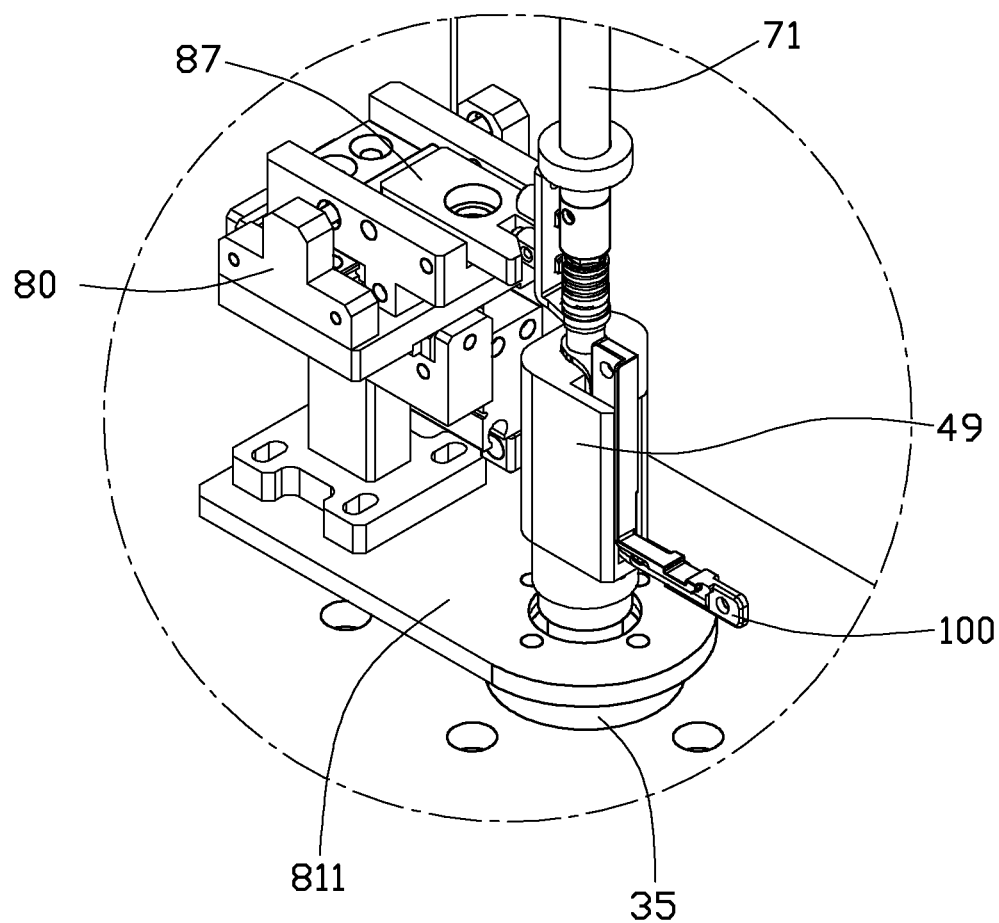
FIG. 12 is a partial enlarged view of an encircled portion of FIG. 11.

Referring to FIG. 12, during assembly of the hinge 100, the second bracket 130 of the hinge 100 is clasped by the retainer 49. The securing fixture 80 is adjusted in the horizontal plane corresponding to the hinge 100, and the first bracket 110 of the hinge 100 is retained by the clasp 87 of the securing fixture 80. Thus, the hinge 100 is retained by the torque-adjusting machine.

During the detecting of torque of the hinge 100, the first bracket 110 retained by securing fixture 80 remains stationary, and the second bracket 130 clasped by the retainer 49 rotates relative to the first bracket 110 driven by the driving motor 41. Torque generated from the hinge 100 is transmitted to the torque-detecting mechanism 30 through the securing fixture 80. The torque sensor 37 detects the torque of the hinge 100. Thus, the user can receive the torque value of hinge 100 from the torque sensor 37.

Figure 13:
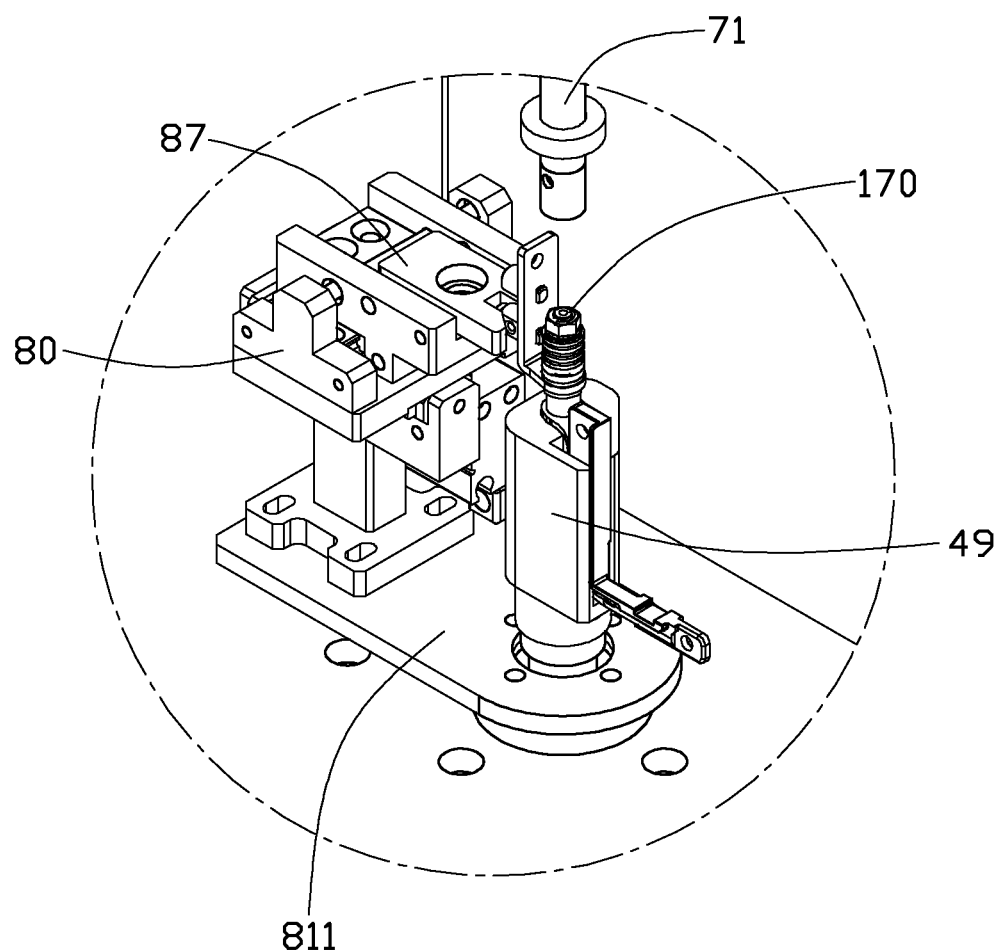
FIG. 13 is similar to FIG. 12, but an adjusting pole is in the raised position.

Referring to FIG. 12 and FIG. 13, during the adjustment of the torque of the hinge 100, the adjusting pole 71 is driven down by the adjusting mechanism 70. A bottom distal-end of the adjusting pole 71 mates with the fastener 170 of the hinge 100. The adjusting pole 71 is rotated clockwise or anti-clockwise to loose or tighten the fastener 170. In this way, the torque of the hinge 100 may be adjusted.

In one embodiment, the torque-adjusting machine can rotate the first bracket 110 relative to the second bracket 130 through the driving device 40 and detect the torque of the hinge 100 through the torque-detecting mechanism 30. The torque of the hinge 100 can be adjusted by the adjusting mechanism 70.

It is also understood, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A torque-adjusting machine comprising:
    a securing fixture, the securing fixture capable of retaining a first bracket of a hinge;
    a driving device, the driving device capable of retaining a second bracket of the hinge;
    a torque-detecting mechanism connected to the securing fixture and capable of second bracket of the detecting torque of the hinge by rotating the first bracket of the hinge relative to the hinge; and
    an adjusting mechanism comprising an adjusting pole, the adjusting pole being rotatable to loosen or tighten the torque of the hinge, the adjusting mechanism further comprising a rotation motor, a rotary tray, and an electro-magnetic clutch;
    wherein in the first position, the rotary tray is capable of being driven to rotate by the rotation motor, the electro-magnetic clutch is powered and magnetically attached to the rotary tray, and the adjusting pole extends through the electro-magnetic clutch is capable of being rotated by force of the electro-magnetic clutch;
    the adjusting pole is capable of moving from a first position, where the adjusting pole is capable of engaging with the hinge and adjusting the torque of the hinge through rotation, to a second position, where the adjusting pole is capable of being disengaged from the hinge.

2. The torque-adjusting machine of claim 1 further comprising an operating console, a bottom chamber located under the operating console, and a system chamber located on the operating console for positioning the adjusting mechanism, the securing fixture is located on the operating console, the torque-detecting mechanism is connected to the securing fixture, the driving device is partially located in the bottom chamber, and the second bracket is retained by the driving device extending through the operating console.

3. The torque-adjusting machine of claim 1, wherein the securing fixture comprises a base, a first securing plate, and a second securing plate, the first securing plate is capable of sliding from a first securing position to a second securing position on the base along a first direction, the second securing plate is capable of sliding from a third securing position to a fourth securing position on the first securing plate along a second direction, the first direction is substantially perpendicular to the second direction, and the second securing plate comprises a clasp for retaining the first bracket.

4. The torque-adjusting machine of claim 1, wherein the torque-detecting mechanism comprises a connecting arm, a torque sensor, and a sleeve connected to the securing fixture; the sleeve and the torque sensor are connected by the connecting arm.

5. The torque-adjusting machine of claim 4, wherein the driving device comprises a driving pole extending though the sleeve, a driving motor connected to the driving pole and a retainer for retaining the second bracket; wherein the driving pole is connected to the retainer, and the retainer is capable of being rotated by the driving motor.

6. The torque-adjusting machine of claim 1, wherein the adjusting mechanism further comprises a lift cylinder and a connecting rod, the lift cylinder and the adjusting pole are connected to the connecting rod, and the adjusting pole is capable of being lifted up from the first position to the second position by the lift cylinder through the connecting rod.

7. The torque-adjusting machine of claim 6, wherein the adjusting pole is capable of free falling from the second position to the first position.

8. The torque-adjusting machine of claim 1, wherein the adjusting pole has a non-circular cross section at the electro-magnetic clutch, and an engaging hole is defined in the electro-magnetic clutch corresponding to the non-circular cross section.

9. The torque-adjusting machine of claim 1, wherein two metal rings are located on the rotary tray, two input electrodes are located on the adjusting mechanism, and each of the two input electrodes slideably contact each of the metal rings.

10. A torque-adjusting machine comprising:
a securing fixture, the securing fixture configured to retain a first bracket of a hinge;
a driving device, the driving device capable of retaining a second bracket of the hinge; and
a torque-detecting mechanism connected to the securing fixture, the torque-detecting mechanism comprises a connecting arm, a torque sensor, and a sleeve connected to the securing fixture, the sleeve and the torque sensor being connected via the connecting arm,
wherein the torque-detecting mechanism is capable of detecting torque of the hinge by rotating the first bracket of the hinge relative to the second bracket of the hinge.

11. The torque-adjusting machine of claim 10 further comprising an operating console, a bottom chamber located under the operating console, and a system chamber located on the operating console for positioning the adjusting mechanism; and
the securing fixture is located on the operating console, the torque-detecting mechanism is connected to the securing fixture, the driving device is partially located in the bottom chamber, and the second bracket is retained by the driving device extending through the operating console.

12. The torque-adjusting machine of claim 10, wherein the securing fixture comprises a base, a first securing plate, and a second securing plate; the first securing plate is capable of sliding from a first securing position to a second securing position on the base along a first direction, the second securing plate is capable of sliding from a third securing position to a fourth securing position on the first securing plate along a second direction, the first direction is substantially perpendicular to the second direction, and the second securing plate comprises a clasp for retaining the first bracket.

13. The torque-adjusting machine of claim 10, wherein the driving device comprises a driving pole extending though the sleeve, a driving motor connected to the driving pole and a retainer for retaining the second bracket; wherein the driving pole is connected to the retainer, and the retainer is capable of being rotated by the driving motor.

14. The torque-adjusting machine of claim 10 further comprising an adjusting mechanism, wherein the adjusting mechanism comprises an adjusting pole to loose or tighten a torque of the hinge; the adjusting pole is capable of moving from a first position, where the adjusting pole is capable of engaging with the hinge and adjusting the torque of the hinge through rotation, to a second position, where the adjusting pole is capable of being disengaged from the hinge.

15. The torque-adjusting machine of claim 14, wherein the adjusting mechanism further comprises a lift cylinder and a connecting rod, the lift cylinder and the adjusting pole are connected to the connecting rod, and the adjusting pole is capable of being lifted up from the first position to the second position by the lift cylinder through the connecting rod.

16. The torque-adjusting machine of claim 14, wherein the adjusting mechanism further comprises a rotation motor, a rotary tray, and an electro-magnetic clutch, in the first position, the rotary tray is capable of being driven to rotate by the rotation motor, the electro-magnetic clutch is powered and magnetically attached to the rotary tray, and the adjusting pole extends through the electro-magnetic clutch is capable of being rotated by force of the electro-magnetic clutch.

17. The torque-adjusting machine of claim 16, wherein the adjusting pole has a non-circular cross section at the electro-magnetic clutch, and an engaging hole is defined in the electro-magnetic clutch corresponding to the non-circular cross section.

18. The torque-adjusting machine of claim 16, wherein two metal rings are located on the rotary tray, two input electrodes are located on the adjusting mechanism, and each of the two input electrodes slideably contact each of the metal rings.

* * * * *